Aug. 26, 1969  H. R. JORY ETAL  3,463,959
CHARGED PARTICLE ACCELERATOR APPARATUS INCLUDING
MEANS FOR CONVERTING A ROTATING HELICAL
BEAM OF CHARGED PARTICLES HAVING
AXIAL MOTION INTO A NON-ROTATING
BEAM OF CHARGED PARTICLES

Filed May 25, 1967  3 Sheets-Sheet 1

INVENTORS
HOWARD R. JORY
ALVIN W. TRIVELPIECE

BY *John C. Randa*

INVENTORS
HOWARD R. JORY
ALVIN W. TRIVELPIECE

BY *John C Randa*

INVENTORS
HOWARD R. JORY
ALVIN W. TRIVELPIECE

BY John C. Randa

United States Patent Office
3,463,959
Patented Aug. 26, 1969

3,463,959
CHARGED PARTICLE ACCELERATOR APPARATUS INCLUDING MEANS FOR CONVERTING A ROTATING HELICAL BEAM OF CHARGED PARTICLES HAVING AXIAL MOTION INTO A NONROTATING BEAM OF CHARGED PARTICLES
Howard R. Jory, Menlo Park, Calif., and Alvin W. Trivelpiece, Silver Spring, Md., assignors to Varian Associates, Palo Alto, Calif., a corporation of California
Filed May 25, 1967, Ser. No. 641,225
Int. Cl. H01j 25/02
U.S. Cl. 315—5
21 Claims

ABSTRACT OF THE DISCLOSURE

A helical shaped beam of charged particles, e.g., electrons from a cyclotron wave accelerator which has both rotational and linear motion can be converted into a beam having only one component of velocity by electrostatic and/or magnetostatic beam extraction mechanisms in order to render the beam more suitable for use in practical applications, e.g., basic particle studies, polymerization, sterilization, etc. The beam takes on a strip configuration in a preferred embodiment which may be scanned if desired.

---

A linear accelerator beam can be converted into a rotating helical beam having axial motion and then transformed into a strip beam having a single component of velocity and then scanned if desired.

Cross-references to related applications

U.S. patent application Ser. No. 576,406 filed Aug. 30, 1966 by H. R. Jory et al. and assigned to the same assignee as the present invention discloses several cyclotron wave charged particle accelerators which can be modified by the teachings of the present invention in an advantageous manner.

Brief summary of the invention

This invention relates in general to the field of high energy charged particle beam-wave accelerators which operate at relativistic energies, e.g., 100 kev. to 100 kev. and more particularly to improvements in both the cyclotron wave accelerator and linear accelerator types which provide enhanced control over the ultimate beam parameters. The cyclotron wave accelerator generates a relativistic electron beam of helical configuration with both rotational and axial motion of the helix and which preferably operates with $\omega_{co} > \omega$, where $\omega_{co}$ is the rest mass cyclotron frequency, for purposes of efficiency and other considerations pointed out in more detail in the aforementioned copending application by Jory et al. This type of beam while useful of and by itself for research and irradiation studies etc. can be improved by incorporating the teachings of the present invention with respect to the ultimate output beam configuration. By introducing electrostatic or magnetostatic extractor and/or converter means at the output end portion of a cyclotron wave accelerator the rotational and axial motion of the helix are converted into pure rectilinear motion with different beam configurations, e.g., a segmented strip beam in scanned or non-scanned versions as desired.

Similarly, the beam emanating from a linear accelerator can be converted into a segmented strip beam by the introduction of rotator and extractor means and scanned if desired. By controlling the relationship of $\omega$ to $\omega_c$, where $\omega_c$ = electron cyclotron frequency in radians and $\omega$ = R.F. drive frequency in radians which determines $d\theta/dt$ or the angular velocity of a beam spot on the helix through control of $B_z$ in a converter section, the orientation and length of the segments of a strip beam relative to the accelerator axis and emanating from an extraction means coupled to the converter section can be controlled as well as the distance between segments. Since the beam emanating from an efficient cyclotron wave accelerator will generally have $\omega_c < \omega$, where $\omega_c$ is the relativistic cyclotron frequency, the use of a converter section prior to the extractor section for control of the $\omega$ to $\omega_c$ relationship is desired in certain cases. By introducing an orthogonal electrostatic field relative to $B_z$ in the extractor section such that $$v_o = \frac{E_o}{B_z}$$

where $v_o$ = total electron velocity at entrance to extractor section (a steady quantity) in meters/sec.
$E_o$ = electric field strength between, e.g., a pair of plates (a steady quantity) in volts/meter
$B_z$ = magnetic field strength in extractor section (a steady quantity) in Webers/meter$^2$ the rotational velocity of the electrons is converted into pure rectilinear motion within the extractor since in crossed electric and magnetic fields as related above an electron will move in a straight path when injected perpendicular to $E_o$ and $B_z$. The specific inter-relationship will be given in the detailed description. Another extractor technique taught by the present invention utilizes a magnetostatic technique wherein a high $\mu$ magnetic shield extractor is introduced into the helical path of the beam to produce a zero $B_z$ region within the extractor and produce the same segmented strip beam that the electrostatic extractor does. The rotational velocity of the rotating helix will be completely converted into rectilinear motion in the extractor. In either the electrostatic or magnetostatic cases the strip beam may be scanned if desired either within the extractor itself or by the addition of a separate scanning section.

The beam emanating from a linear accelerator can be converted into a rotating helical beam with axial velocity by introducing a beam rotator section at the output end of a linear accelerator. The rotator can be, e.g., a resonant cavity immersed in a magnetic field $B_z$ and excited in a circularly polarized $TM_{110}$ mode with magnetomotive force means for producing a desired $\omega_c$ to $\omega$ relationship as discussed above to produce a positive, negative or infinite pitch helix. An extractor section of the type discussed previously may then be used to produce a scanned or unscanned segmented strip beam as desired.

Another extractor approach taught by the present invention involves the introduction of a radial magnetostatic field producing means in the path of an axially translating and rotating helix generated by either a cyclotron wave accelerator or linear accelerator with converter (with or without $B_z$ control means as discussed above). If the radial magnetostatic field involves the simple conversion of $B_z$ into $B_r$ then the electrons in the helical beam will simply be stripped of their rotational energy and will exit from the radial field along tangential trajectories which will generate a helical cone shaped beam formed by a generatrix which rotates at an angular velocity = $\omega$. The width and pitch of the helical cone can be controlled as previously discussed by selection of the $\omega$ to $\omega_c$ ratio desired.

If it is desired to use the helix configuration itself for research or the like purposes but to minimize the energy loss when going through, e.g., a thin aluminum vacuum window or impacting on an X-ray target then an additional source of magnetic field is introduced to double the $B_r$ flux in the radial flux converter section and produce $-B_z$ downstream therefrom. This will strip the helix of its rotational motion and it will simply translate axially in the $-B_z$ field with the individual electrons defining a helix with only axial rectilinear motion for impact on a target. This eliminates energy conversion losses in a window due to rotational electron motion and results in a more linearly directed beam of X-rays from a target.

It is therefore an object of the present invention to provide improved charged particle accelerator apparatus.

A feature of the present invention is the provision of electrostatic and magnetostatic extraction means for producing rectilinear motion from a helical beam of electrons having axial and rotational helical motion of a beam spot with the individual electrons rotating at the cyclotron frequency corresponding to $\omega_c$.

Another feature of the present invention is the provision of a cyclotron wave accelerator having converter means coupled at the output end region for controlling the $\omega$ to $\omega_c$ ratio.

Another feature of the present invention is the provision of a linear accelerator having beam rotator means coupled thereto for converting the linear motion of the electrons into a translating helical beam and extractor means coupled to the rotator means for extracting a strip beam from the translating helical beam.

Another feature of the present invention is the provision of charged particle extractor means for converting a rotating and axially translating helix into a pure axially translating helix.

Another feature of the present invention is the provision of extractor means for converting the rotational motion of a rotating and axially translating helix into a helical cone having its generatrix rotating at $\omega$.

These and other features and advantages of the present invention will become more apparent upon a perusal of the following specification taken in conjunction with the accompanying drawings wherein:

Detailed description

Figure 1:
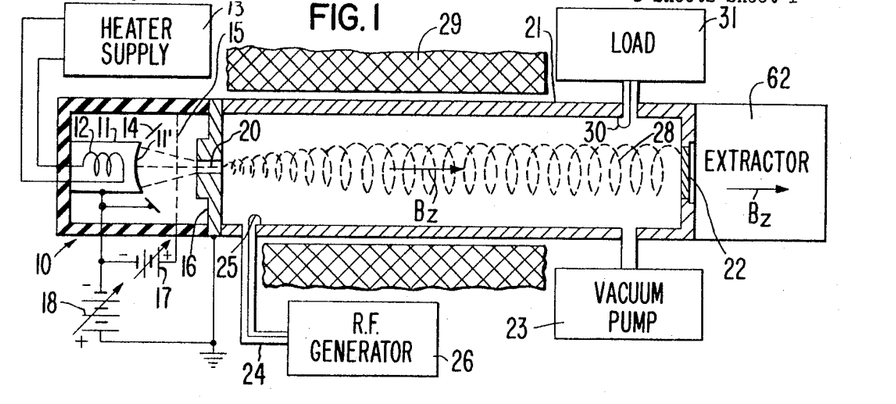
FIG. 1 is a cut-away longitudinal view of a cyclotron wave accelerator incorporating the teachings of the present invention.

Turning now to FIG. 1 there is depicted a traveling wave type of cyclotron wave linear accelerator such as disclosed and claimed in copending U.S. Ser. No. 576,406 by Jory et al. In brief, a cyclotron wave accelerator such as depicted, e.g., in FIGS. 1 and 2 accelerates a charged particle in the direction of power flow of the electromagnetic wave energy in a manner such that the frequency of the wave as seen by the particle is Doppler shifted to a lower value and the decrease in frequency as seen by the particle is exactly the amount necessary to compensate for the lower cyclotron frequency that results from the relativistic increase in particle mass.

The traveling wave cyclotron wave accelerator in FIG. 1 includes electron gun means 10 disposed at the upstream end portion thereof for producing and directing an electron beam along the central beam axis of the device. A suitable gun means 10 includes a thermionic cathode 11 having any suitable filament 12 disposed therein and supplied by any conventional heater supply 13. A focusing anode 14 and grid 15 together with main anode 16 is fed by suitable power supplies 17, 18 as shown. A cut-off waveguide section 20 in the anode 16 prevents R.F. energy from flowing into the gun region while permitting the electron beam emanating from cathode emission surface 11' to enter the cyclotron resonance waveguide region. The cyclotron resonance accelerating region includes a circular cylindrical waveguide 21 coaxially disposed about the central beam axis and terminating at the downstream end portion thereof by any suitable load means 22 such as a thin aluminum foil which will maintain vacuum integrity while permitting the accelerated electrons to pass therethrough or a tungsten target for X-ray generation or any other load means depending upon the desired usage of the accelerator. The cylindrical waveguide 21 is evacuated to a suitable low pressure, e.g., $10^{-6}$ torr by means of a suitable vacuum pump means 23. Electromagnetic wave energy is introduced into the cylindrical waveguide 21 at the upstream end portion via any suitable dominant mode excitation mechanism such as coaxial line 24 and coupling loop 25 fed by a suitable R.F. generator 26 such as a klystron, magnetron, etc. for launching a linearly polarized $TE_{11}$ traveling wave. In this case the electron will synchronize (depending on the direction of the D.C. magnetic field) with one or the other of a pair of equal and oppositely rotating circularly polarized waves into which the linearly polarized $TE_{11}$ wave can be resolved. This excitation system is not as efficient as exciting a circularly polarized $TE_{11}$ wave via any conventional mechanism since effectively only half the field strength in the wave is being used but is considerably simplified in construction.

The electron beam emanating from gun means 10 will assume a helical trajectory of expanding radius as represented by 28 which is a general representation of the motion. By an appropriate selection of $B_z$ values produced by a suitable DC magnetic field generating means such as, e.g., solenoid 29 it is possible to achieve a somewhat stable orbit radius with $v_\theta$ (electron tangential velocities) approaching the speed of light $c$ together with a $v_z$ motion toward the target 22 at the downstream end. The upper limit of $v_\theta$ is a compromise between a desired orbit radius and positive $v_z$ as will be discussed more fully hereinafter.

At the downstream end of the accelerator any suitable electromagnetic wave energy extraction means such as loop coupler 30 and terminating load 31 are used to remove any residual energy which has not been converted into electron kinetic energy.

The following general expression provides the equations of electron motion for electrons in both the traveling wave and cavity types of cyclotron resonance linear accelerator versions.

Equations of motion $$\frac{dv}{dt} = \frac{-e}{m_0\gamma}\left[E + v \times B - \frac{v}{c^2}(v \cdot E)\right]$$

$v$ = electron velocity (a vector quantity)

$$\gamma = \frac{1}{\sqrt{1 - v^2/c^2}}$$

$c$ = velocity of light
$E$ = RF electric field (vector)
$B$ = magnetic field (RF and DC) (vector)

For a circularly polarized $TE_{11}$ wave in cylindrical waveguide the electron cannot remain in synchronism indefinitely at the cyclotron magnetic field because the guide phase velocity is greater than the velocity of light. However, the value of the magnetic field can be adjusted to result in useful energy gains. The following are calculated results for a guide operated at $f/f_c = \sqrt{2}$, with the electrons starting from rest:

where $f = rf$ drive frequency and $f_c$ = guide cutoff frequency for $TE_{11}$ mode $\frac{eE\lambda}{2\pi m_0 c^2}$, (electric field amplitude) = 0.1  0.1  0.1  0.1

$\left(\frac{eB_z}{m_0\omega}\right)$, (DC magnetic field) = 1.0  1.2  1.3  1.4

$\left(\frac{eV}{m_0 c^2}\right)$, (output energy) = 0.611  1.198  1.521  0.142

For larger electric field amplitudes the optimum value of $eB_z/m_0\omega$ will also be larger.

It is seen from the above that in contradistinction to the case of a plane wave having a power flow directed along $B_z$ that relative parameters of $B_z$, $E$ and $\omega$ are considerably different to obtain good energy gains.

For a plane wave $$\omega = \omega_{co} = \frac{eB_z}{m_0}$$

where $\omega$ is the angular frequency of the wave
$\omega_{co}$ = cyclotron angular frequency of electrons based on the rest mass
$e$ = charge on electron
$m_0$ = rest mass of electrons
$B_z$ = DC axial magnetic field strength whereas for the guided wave case of the present invention $$\frac{eB_z}{m_0} > \omega$$

and $$\frac{eB_z}{m_0\omega} > 1$$

Figure 2:
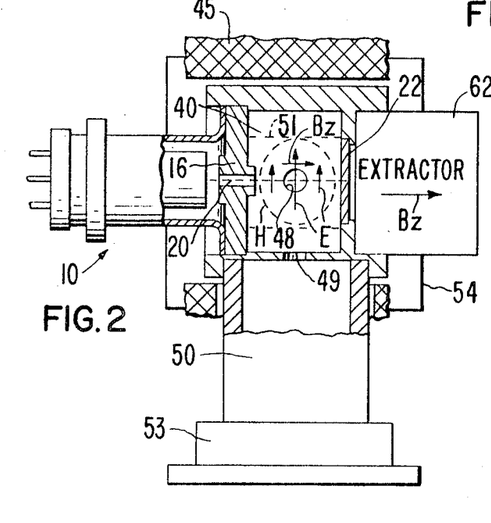
FIG. 2 is a cut-away longitudinal view of a cavity type cyclotron wave accelerator incorporating the teachings of the present invention.

In FIG. 2 a cavity type cyclotron wave accelerator such as disclosed and claimed in copending U.S. Ser. No. 576,406 by Jory et al. is depicted and includes an electron gun means 10 such as depicted in FIG. 1 for generating and directing an electron beam through apertured anode 16 which has a drift tube region 20 dimensioned to be a cut-off waveguide for the RF drive power frequency. The drift tube 20 protrudes into cavity 40 in a re-entrant manner about 20% of the axial cavity length in a preferred embodiment for reasons which will be given in more detail hereinafter.

It is of course to be noted that cavity 40 is to be evacuated below atmospheric pressure by any suitable vacuum pump means such at 23 shown in connection with FIG. 1. Of course, the cavity as well as waveguide accelerators although preferably continuously evacuated, may be evacuated and permanently sealed by any suitable pinch off tubulation or the like if desired and if vacuum maintenance problems are not encountered. The cavity can be terminated by a target 22 such as discussed previously in connection with FIG. 1 for the production of X-rays if desired or to simply permit the electrons to pass through a thin vacuum wall to any desired utilization device. A solenoid such as 45 or any other suitable means is provided to supply a DC axial magnetic field $B_z$ having a value greater than the rest mass cyclotron resonance field as given by $$B_z > \frac{\omega m_0}{e}$$

where $\omega$ = angular frequency of the RF drive energy
$m_0$ = rest mass of an electron
$e$ = electron charge The cavity can be excited by either linearly polarized $TE_{111}$ mode or circularly polarized $TE_{111}$ mode RF energy at $\omega$. In the case of linear polarization, as discussed previously, the electrons injected into cavity 40 will interact with either one or the other of two equal amplitude oppositely rotating circularly polarized waves which means only ½ the RF drive power is being effectively used. Since the injected electrons will have a preferred direction of rotation in the magnetic field $B_z$ they will couple strongly to one of the circularly polarized oppositely rotating RF field components of the linearly polarized $TE_{111}$ wave energy and weakly to the counter-rotating wave. Theoretical calculations indicate that for a given power input to the cavity the circularly polarized $TE_{111}$ fields will produce an accelerated beam with about 30% more energy than a linearly polarized field. Also theoretical calculations indicate that the output energy of the electrons will vary over a few percent in the linearly polarized case depending on the phase of the linearly polarized fields at the instant of electron injection into the accelerator cavity. In the case of the circularly polarized fields the output energy is constant with time. Thus, if a simple RF drive feed is desired the coupling scheme depicted in FIG. 1 which is a simple RF generator 26 coupled to a loop coupler 25 via coaxial line 24 can be used to excite accelerator cavity 40 in a linearly polarized manner in the $TE_{111}$ mode.

However, since theoretical analysis indicates that certain advantages are to be gained by exciting accelerator cavity 40 in a circularly polarized manner a discussion of such a scheme is given hereinafter.

Cavity 40 can be excited with circularly polarized $TE_{111}$ waves by providing a pair of 90° azimuthal space rotated coupling apertures 48, 49 in the side walls of the circular-cylindrical ½λ cavity 40. The coupling apertures are fed via waveguides 50, 51 by a suitable R.F. drive system. For example, an R.F. signal generator such as a klystron can feed a 3 db hybrid coupler with one port terminated in a matched load. The coupler splits the input R.F. energy from the generator into two 90° time phased equal amplitude waves which are coupled via any conventional coupling means, e.g., waveguide into the input waveguide ports 50, 51 via conventional vacuum window flange assemblies 53, 54 to excite a $TE_{111}$ circularly polarized drive wave in accelerator cavity 40. The drive angular frequency $\omega$ is set at the resonant frequency of the cavity. The actual $B_z$ used is set up such that $$\omega_{co} = \frac{eB_z}{m_0} > \omega$$

the exact value selected for optimizing a given parameter. Naturally $$\omega_{co} = \frac{eB_z}{m_0}$$

could be first determined and then $\omega$ selected such that $$\omega_{co} > \omega$$

The end result will be the same. Using variable magnetomotive supply means and variable R.F. generator means is desirable for optimizing the relative values.

In both the cyclotron wave accelerators of FIGS. 1 and 2 and any other types which generate translating helical electron beams via a cyclotron wave process the basic nature of the beam parameters at the output end of the accelerator can be changed by coupling beam extractor and/or beam converter-extractor means to the output end of the device as described more fully hereinafter.

Since many commercial accelerator applications, e.g., cross-polymerization of an endless rectangular strip of polyethlene or any material which can advantageously benefit from irradiation with ionizing radiation require uniform dose rates over large areas the cyclotron wave accelerator-extractor of the present invention will find ample applications in research and industrial production.

Since the cyclotron wave accelerator whether guide or cavity type will operate with $\omega_{co} > \omega$ in the accelerator section for reasons explained previously the use of converter and extractor means in conjunction with the accelerator itself will in effect produce a new accelerator system since the resulting output beam parameters will be radically different from the time rotating helix beam derived from the cyclotron wave accelerator.

To better understand the origin of the rotational motion of the helix, imagine that an electron beam of small diameter and current is situated in a uniform magnetic field so that it injects electrons at some angle with respect to the magnetic field direction. Such an electron beam will have a helical orbit which will be stationary in space and time. The diameter of the orbit will be determined by the injection velocity and the angle of injection. Assuming these parameters fixed, then there will be an axis of symmetry for the helix. Now imagine the electron gun to be attached to a disk whose center is on the axis of symmetry and whose plane is perpendicular to that axis. If the disk is now rotated about this axis of symmetry, the helix will also rotate. If the disk rotates at an angular frequency less than the cyclotron frequency, the helix will rotate in the same direction as the cyclotron motion of the individual electrons. If the disk would rotate at an angular frequency greater than cyclotron frequency, the helix will still rotate in the direction of the cyclotron motion of the individual electrons, except now the "screw" sense of the helix will have changed from righthandedness to lefthandedness. In the case where the angular rotation rate is equal to the cyclotronic rate, the pitch of the helix becomes infinite, the electron beam is straight and parallel to the axis of symmetry and rotates about that axis at the cyclotron frequency.

Each of these situations is possible for the beam obtained from a cyclotron wave accelerator.

The relationship which describes the pitch of the helix P (distance parallel to the axis for one turn around the helix), is given in terms of the z-component, magnetic field is in the z-direction) of the electron velocity $v_z$, the velocity of light $c$, the cyclotron frequency $\omega_c = eB/\gamma m_0$ ($\gamma$ is the relativistic factor $$= \frac{1}{\sqrt{1 - \frac{v^2}{c^2}}}$$

where $v$=total electron velocity)

and the frequency of the R.F. drive in the accelerator $\omega$. This relationship is $$\frac{P}{\lambda} = \frac{v_z}{c}\left[\frac{1}{\frac{\omega_c}{\omega} - 1}\right]$$

where $\lambda$ is the wavelength corresponding to $\omega$. As can be seen, the pitch is either positive, negative, or infinite depending on whether $\omega$ is less than, greater than, or equal to $\omega_c$.

The purpose of the devices disclosed here is to convert the motion described above into rectilinear motion either parallel to or at an angle to the original axis of symmetry of the helical motion. Apparatus which accomplish this and at the same time strip the electron beam from the magnetic field are more desirable in some applications than those which leave the beam in a magnetic field. Apparatus of both types are disclosed.

Figure 3:
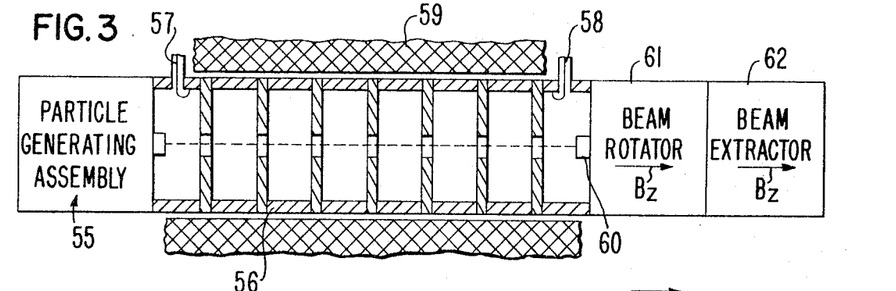
FIG. 3 is a cut-away longitudinal view of a linear accelerator incorporating the teachings of the present invention.
Figure 4:
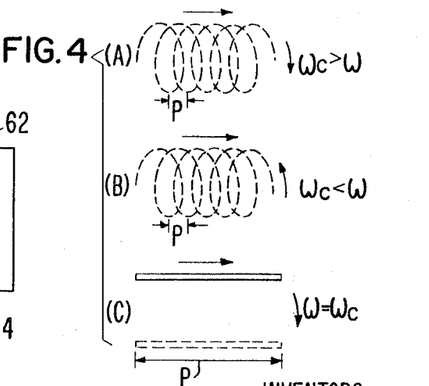
FIG. 4 is an illustrative graphical portrayal of various translational motions associated with cyclotron wave helical beams having different $\omega$ to $\omega_c$ inter-relationships.

The above-described relationships are shown in FIGS. 4A, 4B, and 4C for the three cases. If we also consider the fact that a simple linac or linear accelerator as shown in FIG. 3 can also advantageously benefit from the addition of converter-extractor means at the output end for purposes of producing an e.g., segmented strip beam the overall contributions and scope of the present invention will become more apparent.

Figure 13:
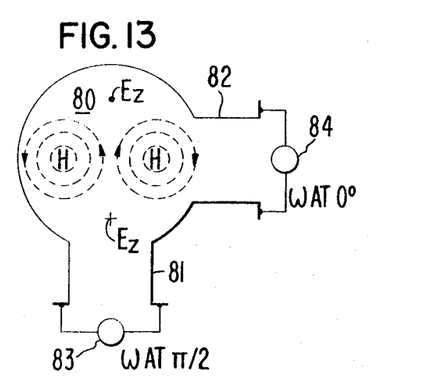
FIG. 13 is a cross-sectional view of a suitable $TM_{110}$ beam rotator and excitation means.

For example, a typical linear accelerator of the type shown in FIG. 3 having electron gun or other particle generator means 55 at the upstream end portion, disk loaded waveguide means 56 and R.F. input and residual energy extraction means 57, 58 at the upstream and downstream ends together with suitable beam focusing means such as solenoid 59 and beam-wave decoupler means such as drift tube section 60 can be converted into a cyclotron wave type of beam generator by the addition of a beam rotator 61 which can be a $TM_{110}$ R.F. cavity section as best seen and described in connection with FIG. 13. An extractor means 62 similar to the extractor means depicted in conjunction with the cyclotron wave accelerators depicted in FIGS. 1 and 2 can now be added to convert the rotating and axially translating helix into, e.g., a segmented strip beam either of the scanned or unscanned type as explained in more detail hereinafter. The linear accelerator depicted in FIG. 3 can be of the type depicted in U.S. Patent No. 3,070,726 by K. B. Mallory assigned to the same assignee as the present invention or any other of the well known linear accelerator types such as e.g., a Van de Graaff generator, D.C. accelerator, resonant transformer etc.

Figure 5A:
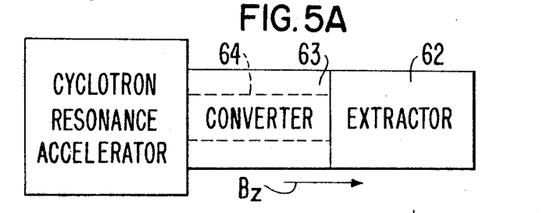
FIGS. 5A and 5B are schematic representations of a cyclotron wave accelerator having converter and extractor sections.

Since the typical cyclotron wave accelerator schematically represented in block diagram form in FIG. 5A will, if operating efficiently, produce a beam with $\omega_c < \omega$ the addition of a converter section 63 prior to the extractor section 62 will permit control of the desired $\omega_c$ to $\omega$ relation in the extractor section. In other words, if an infinite pitch helix is desired, where $\omega_c = \omega$, the converter section can provide an increased $B_z$ by any suitable fixed or variable magnetomotive force means such as, for example, a solenoid such that the converter section provides an $\omega = \omega_c$ condition upon entrance into the beam extractor means 62. An increase in $B_z$ in the converter section relative to the accelerator exit $B_z$ value will result in a decrease in the radius of the helix and an increase in $v_\theta$ as well as a reduction in the axial velocity of the helix while a decrease in $B_z$ in the converter section relative to the accelerator exit $B_z$ value will result in an increase in the helix radius and decrease in $v_\theta$ together with an increase in axial velocity.

The amount by which $B_z$ can be increased by a simple solenoid is limited by the requirement that the axial velocity must not be decreased to zero. In some cases this limit may apply before the desired $\omega_c$ value is achieved in the converter. In these cases a "corkscrew" or helical magnetic field, as described by Wingerson, can be used to convert transverse momentum into axial momentum without any change in the main $B_z$ field. When the axial velocity is increased sufficiently by the corkscrew field, then the required $B_z$ change can be made. See: Richard C. Wingerson, "Corkscrew—A Device for Changing the Magnetic Moment of Charged Particles in a Magnetic Field," Phys. Rev. Letters, 6, No. 9, pp. 446–448, May 1, 1961.

Figure 5B:
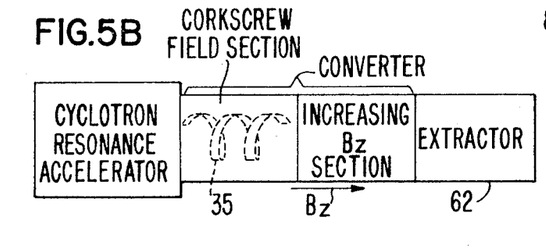

In this case the converter section could take the form shown in FIG. 5B. The corkscrew field can be produced by either a helix of high magnetic permeability wire or a bifilar helix with electric currents passing through adjacent wires in opposite directions. The pitch in either case should be similar to the pitch of the electron beam, but need not be identical. When the axial velocity is increased sufficiently by the corkscrew field, then the desired $B_z$ increase can be made in the next section of the converter by a simple change in the overall solenoid field. The handedness of the iron or other high magnetic permeabilty material helix 35 or bifilar conductor will have to be the same as the handedness of the translating helical beam to produce effective conversion of transverse momentum into axial momentum. Although it is preferable to make the pitch of the magnetic helix or bifilar helix the same as the entering or average helical beam pitch in the corkscrew section considerable differences in same will still produce cumulative useful momentum conversion. The desired $B_z$ field values can be produced by an conventional magnetomotive force means such as discussed previously.

The converter mechanism can be a simple drift tube section 64 which is cut-off to the R.F. drive frequency in the accelerator section and immersed in a uniform or tapered $B_z$ field. A tapered $B_c$ from the final accelerator exit value to the desired extractor $B_z$ will reduce beam perturbations and is accomplished in any well known manner such as, e.g., varying the number of turns in a solenoid.

Figure 6A:
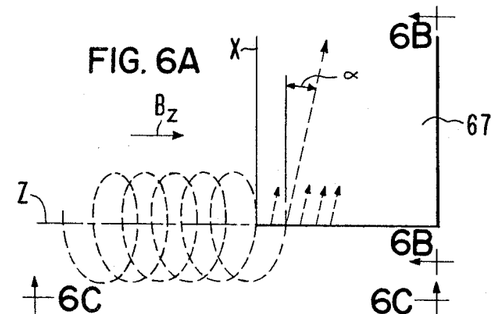
FIGS. 6A, 6B, and 6C are schematic representations of an electrostatic crossed-field extractor system for converting a translating helical beam into a segmented strip beam having rectilinear motion.
Figure 6B:
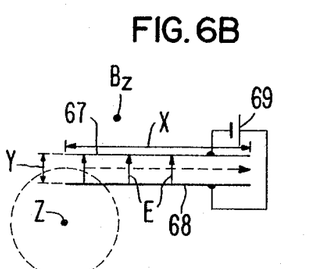
Figure 6C:
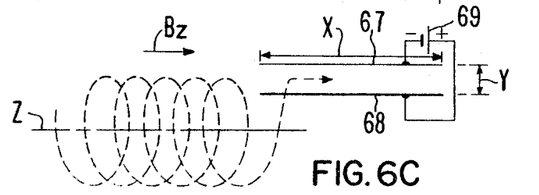

Considering now the electrostatic beam extractor means depicted in FIGS. 6A, 6B and 6C the object is to convert a translating helix beam, that is, a helix which is both rotating and translating axially into a beam having only rectilinear motion. This is accomplished in a crossed-field electrostatic scheme in the embodiment of FIG. 6 by inserting a pair of conductive plates 67, 68 supplied by any suitable pulsed or steady D.C. power source such as battery 69 tangentially into the electron orbit of the helix as shown in FIGS. 6A, 6B, and 6C. If the relationship $$v_0 = \frac{E_0}{B_z}$$

is maintained between the extractor plates and $B_z$ and $E_0$ are orthogonal the rotational motion of the helix will be converted into pure rectilinear motion.

Figure 8A:
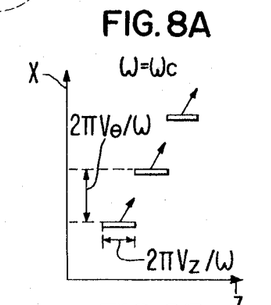
FIGS. 8A, 8B and 8C are illustrative graphical portrayals of the effect of $\omega$ to $\omega_c$ ratios on the resultant segmented strip beams emanating from the extractors depicted in FIGS. 6 and 7.
Figure 8B:
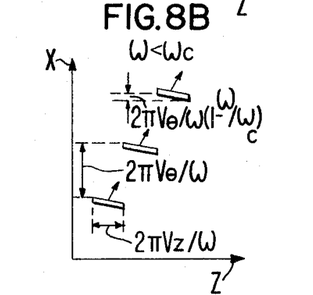
Figure 8C:
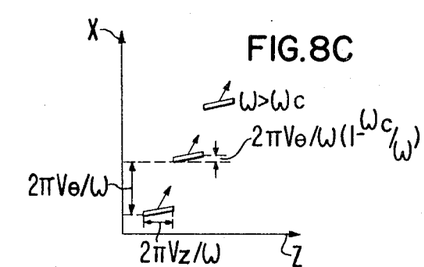

The trajectory of an individual electron is shown in FIG. 6A. Such an electron moves in a helical orbit. Assuming the magnetic field is uniform and the electric field starts abruptly at the edge of the extractor plates, the electron orbit will change from circular as seen by the End View to straight when it enters the region between the plates. From the Plan View it is seen that the electron trajectory in the extractor will preserve the pitch angle $\alpha$ which the electron made with respect to the axis of the helix. This angle is given by $$\tan \alpha = v_z/v_0$$

when $v_0$ is the tangential velocity. The trajectory of an electron which would arrive either earlier or later in time is shown as the dashed lines in the Plan View. Once in the extractor, this electron would have a velocity parallel to the other electron. The required axial length of the extractor plates is determined by the rate of rotation of the beam spot when viewed at a constant axial position and by the axial component of velocity. Since the beam spot rotates at the accelerator or converter frequency $\omega$, the minimum axial length of the extractor plates is $\Delta z = 2\pi v_c w$. If $v_z = 0.25c$ and $\omega = 2\pi \times 10^9$, $\Delta z = 7.5$ cm. The pitch of the helical beam influences the shape of the beam segments within the extractor plates. This effect is illustrated in FIG. 8 for the three cases of an infinite pitch helix with $\omega_c = \omega$, the case $\omega > \omega_c$, and the case $\omega < \omega_c$.

The major axis of a given strip segment as well as the distance between segments and the length of a given strip segment and the orientation of a strip segment major axis relative to the helix axis of symmetry are all controllable factors as shown by the equations set forth in FIG. 8. It is seen then that the translating helix emanating from a cyclotron wave accelerator with or without converter or the rotator section of a linear accelerator will simply write out a segmented strip beam in the electrostatic extractor section which of course is a highly useful form of beam energy.

Figure 7:
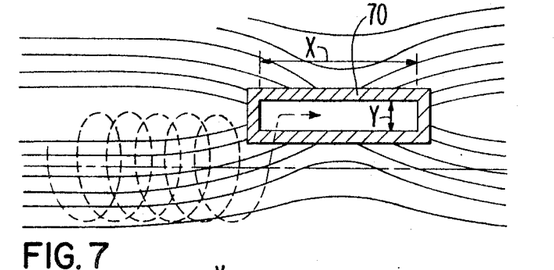
FIG. 7 is a magnetostatic version of the extractor depicted in FIG. 6.
Figure 11:
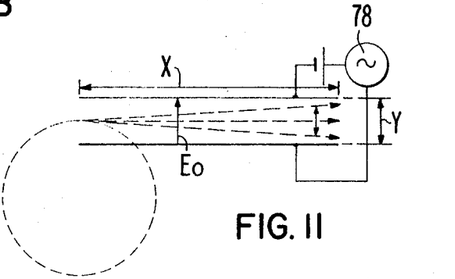
FIG. 11 is a schematic representation of an electrostatic extractor such as depicted in FIG. 6 with beam scanning means incorporated therein.

A magnetostatic equivalent of the electrostatic extractor depicted in FIG. 6 is shown in FIG. 7 and involves the introduction of a high $\mu$ (permeability) hollow channel means 70 such as, for example, of soft iron tangentially to the electron orbits of the helix. The soft iron hollow channel is preferably rectangular in shape as shown and will have axial dimensions at least equivalent to the minimum $\Delta z$ discussed above in conjunction with the electrostatic case. The equations pertaining to the segmented strip beam given for the electrostatic case in FIG. 8 are applicable to the magnetic case. The magnetic shield 70 should be thick enough so as not to saturate and leak in minimal amount of flux in the interior thereof. The principle of operation of the magnetostatic case is simply the removal of the $B_z$ field components to produce a zero $B_z$ in the extractor section by shunting $B_z$ into the high $\mu$ channel as shown in FIG. 7. The rotating and axially translating helical beam will then simply convert all of its rotational energy in the field free region of the channel 70 into rectilinear motion with tan $\alpha$ again equal to $v_z/v_0$. The beam simply writes out an entire pitch of the helix equal to $$2\pi \frac{v_z}{\omega}$$

at one instant of time in the case of an infinite pitch helix or at axial spaced points at different instances of time in the case of either $\omega > \omega_c$ or $\omega < \omega_c$ in the same manner discussed previously in connection with the electrostatic case. Even though the magnetic field does not vanish absolutely instantaneously in space, it is reduced sufficiently such that the radius of curvature of a given electron will be enlarged sufficiently in the extractor channel or zero $B_z$ section to permit substantially all beam energy to be extracted without appreciable loss due to fringe fields. Naturally shim coils may be added in the extractor region to improve the design if desired. In other words, if $B_z$ along the extractor axis in the magnetostatic case of FIG. 7 is reduced too greatly at beam orbit positions azimuthally removed from the channel boundaries the beam may be broken up prematurely. Therefore, the addition of an additional magnetomotive shim coil along the extractor axis may be desirable to improve the extraction while minimizing the loss. Also the $y$ dimension can be increased in both the electrostatic and magnetostatic cases to limits greater than the beam thickness for scanning purposes but with increased requirements for the $E_0$ field in the case of the electrostatic extractor and flux handling capabilities in the case of the magnetostatic extractor. A simplified scanning arrangement for magnestostatic case is to simply add a pair of electrodes as shown in FIG. 11 to the output end of the guide 70 and electrostatically scan the beam.

Figure 9A:
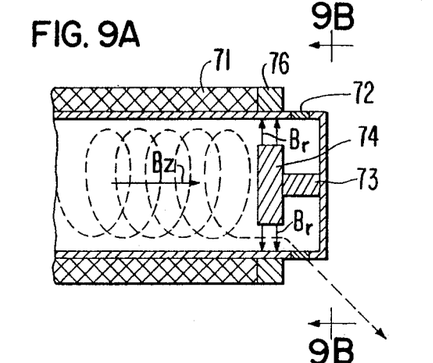
FIGS. 9A, 9B are fragmentary cut-away views of a radial magnetostatic extractor system.
Figure 9B:
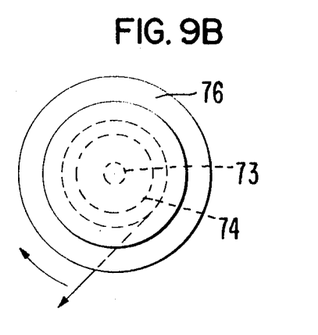

In FIG. 9 a modification of the magnetostatic extractor of FIG. 7 is depicted which involves the conversion of $B_z$ into $B_r$ by use of suitable high $\mu$ pole pieces both internally and externally of the beam such that all the $B_z$ flux is abruptly converted into $B_r$ at the extractor section. The rotating axially translating helix as shown in FIG. 9A and 9B will then be converted via $v_z \times B_r$ and $v_0 \times B_r$ forces into an expanding helix which describes a conical surface.

If the region containing $B_r$ fields is short so that the electrons pass through in a time short compared to a cyclotron period then the electron radial position is unchanged and the beam parameters after the extractor can be determined from Busch's theorem. According to Busch's theorem the electron tangential velocity after the extractor will be one-half the value before the extractor. The axial velocity after the extractor will be increased by an amount which maintains the total electron velocity constant. The values of the transverse velocity and axial velocity after extraction define the conical surface which the beam describes.

The conical-shaped beam has the property that the beam can be spread out over an extremely large surface area without any additional apparatus. The large area is advantgeous to mianimize heating in a vacuum window when the beam is removed from the vacuum envelope. The large beam area could also be useful in processing a large sheet of material by electron radiation. Drawing the sheet through the beam pattern at right angles to the axis of the cone will not result in uniform radiation of the sheet, but the degree of uniformity will be adequate for certain applications.

The beam is extracted via a thin annular ring of e.g., aluminum 72 which forms part of the vacuum envelope of the device. Any suitable mechanical support means such as rod 73 can be used to support the center disk shaped pole piece 74. Any suitable magnetomotive force means such as a solenoid 71 can be used to supply $B_z$, preferably in conjunction with external ring pole piece 76 to aid in concentrating $B_r$.

Figure 10:
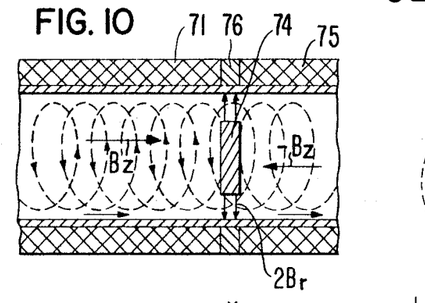
FIG. 10 is a fragmentary cut-away view of a modified radial magnetostatic extractor system.

In FIG. 10 a variation of the extractor of FIG. 9 is shown in which a reverse of $-B_z$ field is introduced at pole piece 74. This produces $2B_r$ radial gap flux in the extractor region and $-B_z$ downstream therefrom. This field is produced by any suitable magnetomotive supply means such as solenoid 75. The effect of this extraction mechanism is to completely strip the helix of its rotational energy and convert it into rectilinear motion such that the rotating helix will no longer rotate in the $-B_z$ region but will simply translate axially as indicated by the arrow. This has the advantage of reducing any energy losses in the vacuum window due to rotational velocity components. The resultant beam can be used to irradiate strips of material with good efficiency and low loss but not with completely uniform radiation over the cross section.

In FIG. 11 a modified electrostatic extractor of the type shown in FIG. 6 is depicted. The extractor of FIG. 11 has scanning means 78 such as, for example, a 60 cycle signal generator which will sweep the beam along the $y$ axis of the extractor plates at the scan frequency. This has the obvious advantage of producing a wider effective beam impingement area. Since the individual strip segments are traveling at a velocity $$v_E = \sqrt{v_\theta^2 + v_z^2}$$

which is practically speaking at the speed of light they are effectively continuous with respect to an object to be irradiated be it stationary or a moving belt type of arrangement. Thus, the use of sweep or scanning means on the extractor plate to scan the beam will greatly improve the effective beam area. Obviously any other additional scanning mechanisms can be used also if desired.

Figure 12:
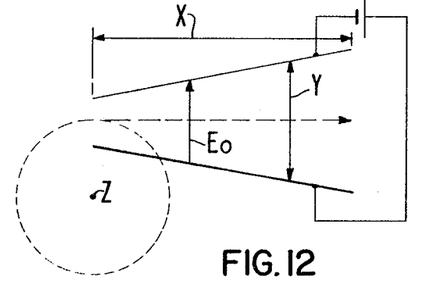
FIG. 12 is a schematic view of a modified extractor such as depicted in FIG. 6.

In FIG. 12 variable spacing between the extractor plates is used as an example of how to effectively maintain $$v_o = \frac{E_o}{B_z}$$

along the extractor axis. Since $B_z$ will be reduced away from the solenoid axis the simple tapered $y$ dimension can be used to reduce $E_o$ an equivalent amount to maintain $$v_o = \frac{E_o}{B_z}$$

along the extractor $x$ dimension. Once again the beam may be scanned in the tapered electrode case by the technique shown in FIG. 11.

In FIG. 13 a suitable beam rotator is depicted which includes a $TM_{110}$ circular cylindrical cavity 80 and circular polarization means for exciting the cavity.

The cavity 80 is driven from a pair of 90° space rotated rectangular waveguides 81, 82 which are excited by any suitable R.F. drive means 90° out of time phase such as generators 83, 84. The waveguides 81, 82 will have their major cross-sectional planes oriented in a transverse plane through the cavity 80 as shown to excite the $TM_{110}$ mode. The cavity can be made one free space wavelength long for good deflection. The R.F. power level and drive frequency $\omega$ are simply set to a level and frequency to induce a sufficient amount of transverse deflection for the initial entrance axial velocity conditions to obtain the desired $\omega$ to $\omega_c$ ratio.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In an electron particle accelerator apparatus, means for generating a rotating and continuously axially moving helical beam of electrons, said apparatus further including means for changing said rotating and continuously axially moving helical beam of electrons into an electron beam having substantially rectilinear motion.

2. The apparatus defined in claim 1 wherein said means for generating a rotating and axially moving helical beam of electrons is a cyclotron wave accelerator and said means for changing said rotating and axially moving helical beam of electrons into an electron beam having substantially rectilinear motion includes beam extractor means for producing a segmented strip shaped beam of electrons.

3. The apparatus defined in claim 1 wherein said means for generating a rotating and axially moving beam of electrons includes a linear electron accelerator having electron rotator means coupled thereto for changing the rectilinear motion of a beam of electrons exiting from said linear accelerator into a rotating and axially moving helical beam of electrons.

4. The apparatus defined in claim 1 wherein said means for changing said rotating and axially moving helical beam of electrons into an electron beam having substantially rectilinear motion includes a pair of spaced electrodes encompassing a portion of the electron orbits of said helix and provided with means for setting up orthogonal electric and magnetic fields such that $$v_o = \frac{E_o}{B_z}$$

where
$v_o$ = electron velocity at entrance to extractor electrodes
$E_o$ = electric field strength at entrance of extractor electrodes
$B_z$ = magnetic field strength at entrance of extractor electrodes 5. The apparatus defined in claim 1 wherein said means for changing said rotating and axially moving helical beam of electrons into an electron beam having substantially rectilinear motion includes hollow high permeability magnetic shield means encompassing a portion of the electron orbits of said helix and producing a substantially zero magnetic field condition within the interior thereof.

6. The apparatus defined in claim 1 wherein said means for changing said rotating and axially moving helical beam of electrons into an electron beam having substantially rectilinear motion includes means for scanning said beam in a direction substantially perpendicular to the direction of the rectilinear motion.

7. The apparatus defined in claim 1 wherein said apparatus includes means for producing a magnetic field directed along the axis of symmetry of said helical beam and wherein said means for changing said rotating and axially moving helical beam of electrons includes means for converting the magnetic field directed along the axis of symmetry of said helical beam into a magnetic field radially directed with respect to the axis of symmetry of said helical electron beam.

8. The apparatus defined in claim 1 wherein said apparatus includes means for producing a first magnetic field directed along the axis of symmetry of said helical beam and wherein said means for changing said rotating and axially moving helical beam of electrons includes means for converting the first magnetic field directed along the axis of symmetry of said helical beam into a magnetic field radially directed with respect to the axis of symmetry of said helical electron beam and means for introducing a second magnetic field equal to the first magnetic field and oppositely directed with respect thereto downstream from said means for changing said rotating and axially moving helical beam of electrons and converting said second magnetic field into a magnetic field radially directed with respect to the axis of symmetry of said helical electron beam in the same axial region where said first magnetic field is converted into a radially directed field.

9. The apparatus defined in claim 1 wherein said apparatus is immersed in a magnetic field directed along the axis of symmetry of said helical electron beam and wherein said apparatus includes means for varying the magnetic field strength such that the ratio of $\omega$ to $\omega_c$, where $\omega$ = angular frequency in radians of the source of the rotating helical beam, and $$\omega_c = \frac{eB_z}{m_0 \gamma}$$

is the cyclotron frequency where
$B_z$ = the value of the magnetic field strength at the exit region of the means for generating the helical beam
$e$ = electronic charge
$m_0$ = rest mass of an electron $$\gamma = \frac{1}{\sqrt{1 - v^2/c^2}} = \text{relativistic mass factor}$$

can be controlled downstream from said means for generating the helical beam and prior to entrance into said means for changing said rotating and axially moving helical beam of electrons into an electron beam having substantially rectilinear motion.

10. In a charged particle accelerator apparatus having R.F. drive means immersed in an axially directed magnetic field $B_z$ for producing a rotating and continuously axially moving helical beam of electrons having a pitch to axial velocity relationship expressed as follows:

$$\frac{P}{\lambda} = \frac{v_z}{c} \left[ \frac{1}{\frac{\omega_c}{\omega} - 1} \right]$$

where
$p$ = helix pitch (distance parallel to the axis of symmetry of helix for one turn of helix)
$\lambda$ = wavelength corresponding to $\omega$
$v_z$ = electron velocity parallel to axis of symmetry of helix
$c$ = velocity of light
$\omega$ = R.F. drive angular frequency of the accelerator $$\omega_c = \frac{eB_z}{\gamma m_0}$$

where
$e$ = electron charge
$B_z$ = magnetic field strength as measured along axis of symmetry of helix
$m_0$ = rest mass of an electron $$\gamma = \frac{1}{\sqrt{1 - \frac{v^2}{c^2}}} \text{(relativistic correction factor)}$$

where
$v$ = total electron velocity
said apparatus further including means for changing said helical beam into a continuously moving beam of electrons having substantially only rectilinear motion.

11. The apparatus defined in claim 10 wherein said apparatus includes means for varying the $\omega$ to $\omega_c$ ratio prior to entrance of said helical beam into said means for changing said helical beam into a beam of electrons having substantially only rectilinear motion.

12. The apparatus defined in claim 10 wherein said means for changing said helical beam into a beam of electrons having substantially only rectilinear motion includes electrostatic extraction means encompassing at least a portion of the helical orbits of said electrons and introducing an orthogonal E-field with respect to said $B_z$ field in the extraction means such that said rotating and axially moving helical beam of electrons is converted into a segmented strip beam having individual strip lengths $$= \frac{2\pi v_z}{\omega}$$

as measured parallel to the axis of symmetry of the helical beam of electrons.

13. The apparatus defined in claim 10 wherein said apparatus further includes means for scanning said electron beam in a direction perpendicular to the direction of rectilinear motion.

14. The apparatus defined in claim 10 wherein said apparatus includes linear accelerator means for accelerating said electron beam along a linear path disposed upstream from said R.F. drive means.

15. The apparatus defined in claim 10 wherein said means for changing said helical beam into a beam of electrons having substantially only rectilinear motion includes means for converting said $B_z$ magnetic field into a $B_r$ magnetic field radially oriented with respect to the axis of symmetry of said helical electron beam.

16. The apparatus defined in claim 10 wherein said means for changing said helical beam into a beam of electrons having substantially only rectilinear motion includes means for producing a substantially zero magnetic field region which encompasses at least a portion of the electron orbits of said helical beam.

17. Apparatus for converting a rotating and axially moving helical beam of electrons immersed in a magnetic field $B_z$ and axially moving parallel thereto into a beam of electrons having substantially only rectilinear motion including means for producing orthogonal electric and magnetic fields encompassing at least a portion of the electron orbits of said helical electron beam such that the electrons are directed along a beam path with substantially only rectilinear motion given by $$\tan \alpha = \frac{v_z}{v_\theta}$$

where
$\alpha$ = the angle between the axis of symmetry of said helical beam of electrons and the beam path with substantially only rectilinear motion
$v_z$ = electron axial velocity parallel to the axis of symmetry of said helical beam of electrons
$v_\theta$ = tangential electron velocity of said helical beam of electrons.

18. The apparatus defined in claim 17 wherein said apparatus further includes means for scanning said electron beam in a direction substantially perpendicular to said beam path with substantially only rectilinear motion.

19. Apparatus for converting a rotating and axially moving helical beam of electrons immersed in a magnetic field $B_z$ and axially moving parallel thereto into a beam of electrons having substantially only rectilinear motion including means for producing a region of substantially zero magnetic field encompasing at least a portion of the electron orbits of said helical electron beam such that the electrons are directed along a beam path with substantially only rectilinear motion given by $$\tan \alpha = \frac{v_z}{v_\theta}$$

where
- $\alpha$ = the angle between the axis of symmetry of said helical beam of electrons and the beam path with substantially only rectilinear motion
- $v_z$ = electron axial velocity parallel to the axis of symmetry of said helical beam of electrons
- $v_\theta$ = tangential electron velocity of said helical beam of electrons.

20. In a cyclotron wave accelerator of electrons having energy ranges of 100 kev. to 100 mev. including, means for obtaining a rotating and continuously axially moving helical beam of electrons with axial motion directed parallel to a magnetic field within which said helical beam of electrons is immersed, and means for changing the rotating and continuously axially moving helical beam of electrons into a segmented strip beam of electrons having substantially only rectilinear motion.

21. The accelerator defined in claim 20 wherein said accelerator includes means for scanning said segmented strip beam of electrons along a path which is substantially perpendicular to the major axis of said segments.

References Cited

UNITED STATES PATENTS 3,184,632   5/1965   Weibel   315—7

HERMAN KARL SAALBACH, Primary Examiner

SAXFIELD CHATMON, Jr., Assistant Examiner

U.S. Cl. X.R.

315—3.5, 5.41, 5.42, 7; 328—233